Sept. 1, 1964     T. R. E. KRESSMAN ET AL     3,147,214
REMOVAL OF ANIONS FROM AQUEOUS SOLUTIONS
Filed Feb. 14, 1961
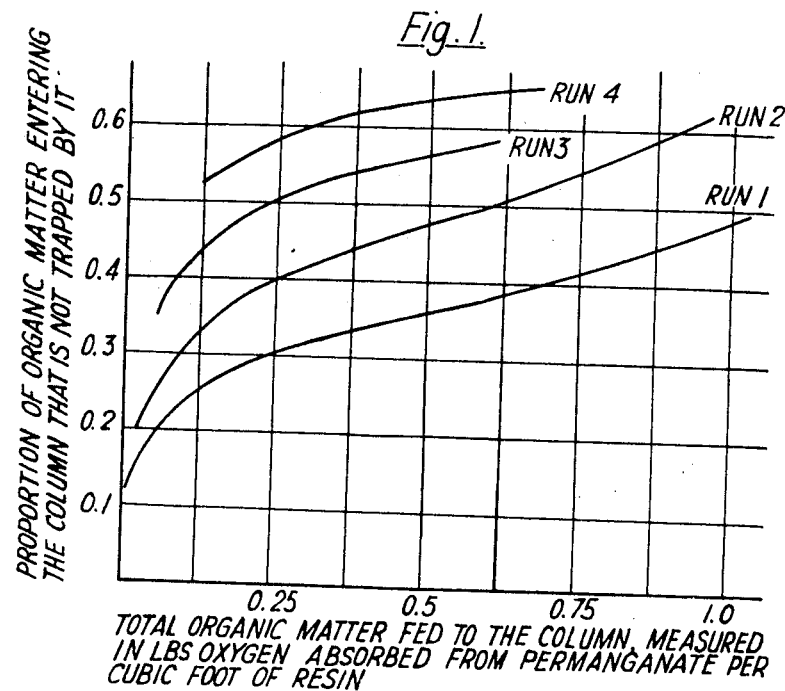
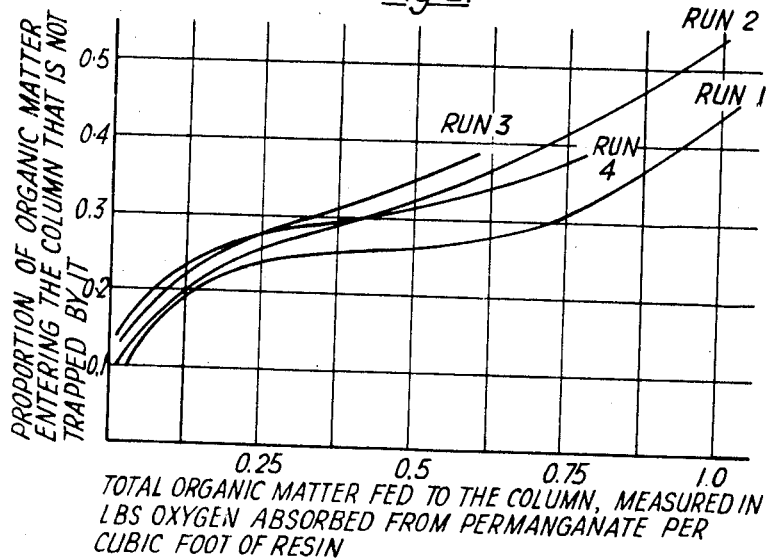
Inventors:
THEODORE ROGER ERNEST KRESSMAN & JOHN ROBERT MILLAR
By Bailey, Stephens & Shelley
Attorneys

United States Patent Office 3,147,214
Patented Sept. 1, 1964

3,147,214
REMOVAL OF ANIONS FROM AQUEOUS SOLUTIONS
Theodore Roger Ernest Kressman, Watford, England, and John Robert Millar, Glamorgan, Wales, assignors to The Permutit Company Limited
Filed Feb. 14, 1961, Ser. No. 89,209
Claims priority, application Great Britain July 9, 1958
11 Claims. (Cl. 210—24)

This invention relates to the removal of anions from aqueous solutions. The application is a continuation-in-part of our application Serial No. 824,960, filed July 6, 1959, now abandoned, for "Ion-Exchange Processes."

In order to demineralise aqueous solutions containing dissolved salts, e.g. tap water, it is common practice to pass them either first through a granular bed of a cation-exchange resin charged with hydrogen ions and then through a granular bed of an anion-exchange resin in the free base form, or through a bed consisting of a mixture of such resins. If, however, the electrolyte contains organic impurities a phenomenon known as fouling of the anion-exchange resin often occurs in the course of repeated cycles of treatment and regeneration, and in time the resin may become completely useless. This fouling is particularly troublesome when the anion-exchange resin contains strong-base groups, though it is also apparent with resins in which the groups are wholly or largely weakly basic.

In water-treatment practice the fouling is by organic matter present in the water and is manifested by a decreased capacity of the resin for exchanging inorganic anions (i.e. for demineralising), a less complete exchange or uptake of those ions (i.e. a greater leakage of ions), and the need for a larger volume of rinse water after regeneration to remove the excess regenerant. Fouling seriously limits the useful life of the resin and necessitates its replacement while it is otherwise still in good condition. This is expensive. The fouling is thought to be due to the organic impurities becoming irreversibly absorbed on the resin and preventing access of the ions in solution to the ion-exchange sites. The exact nature of the impurities that are thus absorbed from raw water is not known, but particularly severe fouling is found to occur in the demineralisation of surface waters. This is in contrast to deep-well waters in which the organic matter is in much lower concentration and is thus much less troublesome.

Resins containing strongly basic groups are used in mixed resin beds (i.e. beds containing mixtures of cation-exchange and anion-exchange resins) for the removal of silica, particularly from boiler feedwater. Only these groups will remove silica, but it is when these groups are present that fouling is most troublesome. The same problem of fouling occurs when water to be demineralised is passed through a cation-exchange bed and then through one or more beds of anion-exchange resins. Fouling can also occur when water or other aqueous liquid is treated electrodialytically in a cell containing ion-selective membranes composed of or containing anion-exchange resins.

The strongly basic resins include those which owe their ion-exchange properties to quaternary ammonium, guanidium, tertiary sulphonium or tertiary phosphonium groups. Some resins have both strongly basic and weakly basic groups, an example being a chlormethylated cross-linked polystyrene aminated with dimethylamine. The fouling referred to is particularly apparent with resins containing strongly basic groups and presents a formidable problem whenever the resin contains any considerable proportion, say 20%, of such groups and a liquid containing organic matter is under treatment.

Normal ion-exchange resins, even those commonly referred to as highly porous, are microporous. We have now found that by using certain resins with large pores and strongly basic groups, which we will call macroporous resins, the trouble caused by fouling is eliminated.

It is difficult or even impossible to define the porosity of a resin in numerical terms, but we have devised a test which allows the utility of a resin for the present purposes to be determined. In order to carry out this test on a resin, it is first necessary to know the proportion of strongly basic groups in it. The number of strongly basic ion-exchange groups present in a resin can be determined by treating a bed of the resin with 8 bed volumes of 5% ammonia and then converting the groups fully to the Cl-form with an excess of N NaCl, rinsing off the excess salt with distilled water and then passing 0.5 N $KNO_3$ through the bed until no more chloride appears in the effluent. The total chloride liberated by the potassium nitrate is titrated with standard silver nitrate solution. This metal gives the total number of strong base groups in the resin and if there are some weak-base groups also these will not be included in this measurement. The total strong- and weak-base capacity can be determined by passing an excess of 0.5 N HCl through the bed, which is then rinsed with 0.001 N HCl and treated with 0.5 N $KNO_3$, the liberated chloride being titrated as before. The difference between the two titrations corresponds to the weak-base groups.

In the test for the utility of a macroporous resin, 25 cc. of the wet resin in the form of a column is treated with 5% aqueous sodium hydroxide solution until it is fully in the hydroxide form. The excess alkali is then washed away with distilled or demineralised water, which is then drained to the level of the top of the column. A solution containing 0.05 mole of tertiary-butyl catechol sulphonic acid (TBCS) per litre of water is then passed through the column of resin at 5 cc./min. until TBCS first appears in the effluent. This point of breakthrough can be determined by a rise in the electrical conductivity, care being taken to see that a rise in conductivity is, in fact, due to the sulphonic acid breaking through and not due to a trace of alkali. The rise in conductivity must be accompanied by an acid and not an alkaline reaction. As soon as such a rise in conductivity occurs, the volume of TBCS solution that has been used is measured, a volume of 10 cc. being subtracted to allow for the water originally filling the voids in the column.

The column is then regenerated with 5% aqueous sodium hydroxide solution in an amount equivalent to twice the stoichiometric quantity (i.e. equivalent to twice the total number of strong-base and weak-base ion-exchange groups present in the column), the excess again being washed off with water. The cycle of treatment with the standard TBCS solution followed by regeneration with two stoichiometric proportions of 5% aqueous sodium hydroxide solution is repeated, the volume of TBCS solution to breakthrough being recorded after each treatment.

The capacity to breakthrough of every resin we have tested in this way falls after the first cycle, and continues to fall to a lesser extent after subsequent cycles until it reaches a value that stays substantially constant. This constant value is generally reached at the end of the sixth cycle at the latest. The constant capacity thus attained can be expressed as a percentage of the strong-base capacity of the resin initially. This percentage is about 4 to 6 with conventional strongly basic ion-exchange resins, for example one prepared by chlormethylating and aminating with a tertiary amine a copolymer of styrene and divinyl benzene containing 5% divinyl benzene. With the macroporous resins, however, the percentage is usually 35 or more. We find that a resin that has the ability to exchange ions for the ions of TBCS in successive cycles and arrives at a substantially constant capacity that is at least 15% of the initial strong-base capacity also has the ability to withstand the effect of the natural fouling materials. Such a resin will be called TBCS-satisfactory.

Broadly in this invention an aqueous liquid containing both inorganic anions and organic impurities is treated with a macroporous TBCS-satisfactory resin containing strongly basic groups, and preferably with one in which substantially all the ion-exchange groups are strongly basic.

The invention can be carried out in two ways. In the first way the macroporous resin is used to take up the inorganic anions in exchange for hydroxyl ions, and then it is used predominantly in the free-base form. In the second way of carrying out the invention the macroporous resin is used as a trap or filter for organic matter and the inorganic anions are subsequently removed either by ion exchange or in an electrodialytic cell. In this case the macroporous resin is used in the exhausted form, i.e. in the form in which it is in ionic equilibruim with the liquid under treatment. When it is so used the inorganic anions in the liquid are not exchanged by it to any substantial extent.

The reason why macroporous resins pass the TBCS test and are useful in the invention, but microporous resins fail to pass the test, seems to be the presence of pores so large that the fouling molecules can pass through them instead of being wedged in them. However this may be, one satisfactory macroporous resin has a mean pore diameter of about 100 Angstrom units. An appreciable portion of the pores will be even larger than this, and for example satisfactory resins can be made by introducing ion-exchange groups into a cross-linked polymer having 10-20% of its total pore volume in the form of pores greater than 350 A.U. in width.

A fundamental difference between a macroporous and a microporous resin is that the skeleton of a macroporous resin tends to be more rigid than that of a microporous resin. The pores of a macroporous resin still largely exist in the resin when it is in the dry state, and liquid is absorbed by the dry resin in much the same way as it is by a sponge, i.e. by entering the pre-existing holes. The pores of a normal microporous resin, on the other hand, shrink when the resin is dried, and liquid is absorbed by the dry resin by an expansion of the cross-linked network, the liquid being accommodated in the freshly-formed interstices of the expanded network, which are of molecular dimensions.

Macroporous resins suitable for use in the process of the invention can be prepared by co-polymerising a compound having one polymerisable double bond, for example a mono-vinyl compound such as styrene, with a high proportion of a compound having two or more polymerisable double bonds, for example a divinyl compound such as divinyl benzene, as a cross-linking agent, in the presence of a solvent. Anion-exchange groups are then introduced into the polymer in known manner, for example, by chloromethylating the polymer and then aminating the product to introduce quaternary ammonium groups. The polymerisation is preferably performed using the technique of suspension polymerisation.

In order to produce a TBCS-satisfactory macroporous resin it is important that the proportion of cross-linking agent should be high. In the manufacture of microporous resins it is well known that the proportion of the cross-linking agent is commonly from 2-10%, but in the resins used according to the invention the proportion should in general be at least 25% and preferably 30% or more. In addition, to ensure adequate macroporosity, the normal process of suspension polymerisation employed in the manufacture of microporous resins must be varied. This variation involves, as indicated above, the presence of a solvent for the monomers. This solvent, e.g. hexane, may be a precipitant for the polymer, as described in application Serial No. 789,517 of J. R. Millar. Again the solvent for the monomer mixture may also be a swelling agent for the copolymer. Suitable solvents that are also such swelling agents are toluene and xylene.

When a small proportion of cross-linking agent is used a polymer results that is virtually indistinguishable from a conventional one made in the absence of solvent or precipitant. As the proportion of cross-linking agent is increased the transition to macroporosity takes place fairly sharply when the proportion of cross-linking agent reaches a certain level that depends upon the proportion of solvent or precipitant used. In the case of a copolymer of styrene and divinyl benzene made with a solvent, there should be at least 45% solvent (based on the total mixture) when the divinyl benzene amounts to 25% of the monomer mixture. With 33% divinyl benzene in the monomer mixture the minimum solvent is 35% of the total mixture. With 55% divinyl benzene the minimum solvent is 30%, and remains 30% as the divinyl benzene is increased. There should not be more than 80% solvent in the total mixture in any event. As the proportion of solvent increases, so should the proportion of catalyst increase in order to effect polymerisation.

By way of example a macroporous anion-exchange resin was prepared as follows:

EXAMPLE 1

10 gms. azobisisobutyronitrile was dissolved in a mixture of 150 cc. styrene, 250 cc. of a commercial divinyl benzene concentrate containing 50% divinyl benzene and 50% ethyl styrene and 800 cc. of toluene. The solution was stirred up with water containing a suspension stabiliser (0.1% polyvinyl alcohol) so as to form globules of particle size about 14 to 52 mesh. The whole was heated to about 75° C. with continuous stirring for 18-24 hours, after which time polymerisation was substantially complete and the globules had become converted to solid spheres. A solution of 1 gm. t-butyl catechol in 100 cc. toluene was then added and the stirring continued for a further 1 hour. Finally the toluene was removed by distillation and the toluene-free polymer beads filtered off from the water and dried at 100° C.

The dried beads were swollen in 1.5 litres ethylene dichloride and a mixture of 940 gms. chlormethyl ether containing 350 gms. powdered anhydrous aluminium chloride was then added. The whole was warmed to 60°-65° C. for 12 hours, then poured into an excess of water and the beads filtered off and washed with water. They were then covered with 2 litres of 25% aqueous trimethylamine solution and left in the cold for 12 hours. The resulting aminated beads were filtered off and washed with dilute HCl and then with water.

The hydrocarbon polymer before the introduction of the ion-exchange groups was found to have 77% of its pore volume in the form of macropores. When the properties of 25 cc. of the anion-exchange resin were determined by the TBCS test using 0.05 M. TBCS the results shown in the following table were obtained. Corresponding results for a conventional strongly basic microporous polystyrene anion-exchange resin mentioned above and for a commercial so-called "non-fouling" resin are given for comparison.

*Table 1*

CAPACITY OF RESIN AS PERCENTAGE OF INITIAL STRONG-BASE CAPACITY

| Cycle No. | Macroporous resin | Microporous resin | Commercial "non-fouling" resin |
|---|---|---|---|
| 1 | 63 | 37 | 18 |
| 2 | 47 | 9 | 8 |
| 3 | 44 | 8 | 6 |
| 4 | 38 | 7 | 2.5 |
| 5 | 40 | 6 | 4.5 |
| 6 | 39 | 3 | 2.0 |
| 7 | 39 | 3.5 | 2.0 |
| 8 | 38 | 3.5 | |

The attainment of the substantially constant capacity is clearly shown by this table.

During the production of the resin as described in Example 1, the toluene acts as a swelling solvent, and on its removal there may be an irreversible loss of porosity unless a compound is present capable of destroying free radicals and hence of inhibiting branching. Tertiary butyl catechol is such a compound and was used in the example just given. Other compounds may be used, however, and should preferably be soluble in the swelling solvent.

Having explained how to produce a TBCS-satisfactory resin we turn now to the use of the resin in the free-base form as a substitute for a conventional microporous resin. This substitution is particularly valuable in the demineralisation of water, either by the passage of the water through a bed of mixed cation-exchange and anion-exchange resins in which the anion-exchange resin is a macroporous TBCS-satisfactory anion-exchange resin containing strongly basic groups, or by the passage of the water first through a bed of cation-exchange resin and thereafter through a bed of such an anion-exchange resin, with or without passage through another bed of anion-exchange resin.

We find that not only are the TBCS-satisfactory macroporous resins less susceptible to fouling by organic impurities that may be present in aqueous liquids than are conventional microporous resins, but also that their capacity for removing organic matter is higher than that of a microporous resin. It therefore follows that a treated water of lower organic content can be produced by the invention.

A comparative example will now be given to show the improved maintenance of the capacity of the resins used according to the invention.

EXAMPLE 2

First, a mixed bed of conventional polystyrene cross-linked microporous resins, the cation-exchange resin having sulphonic groups and the anion-exchange resin quaternary ammonium groups, was used to treat London tap water. When the resins were exhausted the cation-exchange resin was regenerated with 4.8 lb. $H_2SO_4$/cu. ft. and the anion-exchange resin with 3 lb. NaOH/cu. ft. When the bed was installed it showed the following characteristics:

Capacity of the anion-exchange resin
  between regenerations _____ 7.1 kgr./cu. ft. as $CaCO_3$.
Average conductivity _____ 0.2 micromho.
Volume of rinse water required to reduce the conductivity of the treated water to 2 micromhos _____ 3.0 bed volumes.

On successive runs and regenerations the capacity decreased and the average conductivity and rinse-water requirement increased progressively until after the 150th run the characteristics were:

Capacity of the anion-exchange resin
  between regenerations _____ 3.5 kgr./cu. ft. as $CaCO_3$.
Average conductivity _____ 1.0 micromho.
Volume of rinse water required to reduce the conductivity of the treated water to 2 micromhos _____ 6.0 bed volumes.

At this point the anion-exchange resin was removed and replaced by an equal quantity of a TBCS-satisfactory macroporous resin. The characteristics of the bed were then initially:

Capacity of the anion-exchange resin
  between regenerations _____ 7.8 kgr./cu. ft. as $CaCO_3$.
Average conductivity _____ 0.1 micromho.
Volume of rinse water required to reduce the conductivity of the treated water to 2 micromhos _____ 1.0 bed volume.

After 210 regenerations the characteristics were:

Capacity of the anion-exchange resin
  between regenerations _____ 7.4 kgr./cu. ft. as $CaCO_3$.
Average conductivity _____ 0.2 micromho.
Volume of rinse water required to reduce the conductivity of the treated water to 2 micromhos _____ 1.5 bed volumes.

The advantage of using a mixture of a microporous cation-exchange resin and a macroporous anion-exchange resin to give a demineralised water of low organic content is illustrated by the following example:

EXAMPLE 3

Two mixed-bed columns each containing 2 volumes of anion-exchange resin and 1 volume of cation-exchange resin were used. Before they were mixed the resins were separately activated with an excess of 5% NaOH and 5% HCl respectively, the excesses being rinsed off with water.

The resins in the first column were conventional microporous polystyrene resins, and those in the second were the same macroporous resin containing quaternary ammonium groups and microporous resin containing sulphonic groups as in Example 2. The two columns were fed with London tap water and the organic content of the demineralised waters as measured by their oxygen absorption (O/A) from $KMnO_4$ were recorded and found to be as follows:

|  | O/A, p.p.m. |
|---|---|
| Raw water | 1.24 |
| Water from the microporous mixed bed | 0.96 |
| Water from the mixed bed containing a macroporous anion-exchange resin | 0.37 |

As mentioned above the macroporous resin can also be used as a filter or trap for the organic impurities. In the course of time it becomes saturated with organic matter through not fouled by it in the same way as a microporous resin. Accordingly it can be regenerated to regain all or substantially all of its original capacity. The macroporous trap resin does not remove all the organic matter from the liquid, but (provided it is regenerated well before it becomes saturated) the organic matter which it does not trap does not foul a resin subsequently used for taking up the inorganic ions or an electrodialytic membrane containing such a resin.

A conventional microporous strongly basic resin will act as a trap but it more or less quickly becomes fouled. In doing so it fails to remove the organic matter sufficiently completely and the subsequent anion-exchange resin with which the liquid comes into contact is still fouled, albeit somewhat less rapidly. When that resin is in a mixed bed, it and the trap bed have now to be discarded, and the arrangement is no less costly than if the trap bed were omitted. Moreover when a conventional microporous resin is used in a trap bed, additional organic matter comes through on successive cycles in progressively increasing quantities, even if the resin is regenerated before saturation. This matter fouls the subsequent resin more and more, and the life of the latter is only a little longer than that of an unprotected resin.

When used as a trap the macroporous resin need not initially be in ionic equilibrium with the liquid being treated, but may be in the free-base form or any convenient salt form. It will soon come into equilibrium with the liquid and will not thereafter alter the composition of the liquid passing through it except for removing organic matter.

Whether the subsequent removal of the inorganic anions is effected by ion exchange in a resin bed or in an electrodialytic cell having membranes composed of or containing an anion-exchange resin, the advantage is obtained that the resins are not fouled by the organic impurities. They may advantageously be microporous.

Because the concentration of organic matter is generally small, the volume of water that a filter bed of macroporous resin can treat before it must be regenerated can be very large. The regeneration can be effected either with a solution of a water-soluble salt, e.g. sodium chloride, which may be neutral or made slightly acid or alkaline, or with a solution containing both a water-soluble salt and a mild oxidising agent. Solutions containing sodium chloride and hypochlorite are particularly satisfactory.

Some examples of the use of the macroporous resin as a trap will now be given, reference being made to the annexed drawings, in which FIGURE 1 is a graph obtained with a microporous resin and FIGURE 2 a graph obtained with a macroporous resin.

EXAMPLE 4

This illustrates the longer life of the macroporous resin compared with a conventional strongly basic resin in a trap column.

Two columns were arranged side by side, each consisting of 50 cc. of resin in a ⅝″ diameter tube. The first resin was a conventional strongly basic polystyrene anion-exchange resin, and the second was a macroporous resin prepared as described in Example 1. Both resins were in the chloride form.

The columns were each fed at 30 cc. per minute with London tap water of the following composition:

|  | P.p.m. |
|---|---|
| Theoretical mineral acidity (Th. M.A.) | 120 |
| Alkalinity (Alk. A.) | 205 |
| Silica ($SiO_2$) | 10 |
| Oxygen absorbed from $KMnO_4$ (4 hr., 27° C.) | 1.2–2.0 |

The oxygen absorbed (OA) is a measure of the organic matter present, which varies seasonally. During the runs, the variation was between the limits shown. It is found that the effect of this variation can be nullified by expressing the organic matter that passes through the trap column as a ratio of that entering in the raw water at that moment. This ratio was measured at intervals throughout the run.

When the equivalent of 1 lb. of organic matter (expressed as OA) per cu. ft. resin had passed into each tube, the resin was regenerated with 80 cc. of 10% NaCl solution, the excess being rinsed off with tap water. The organic matter in the regenerant effluent was determined by measuring the oxygen absorbed from permanganate. Another run was carried out, followed by a regeneration, and this cycle was repeated several times.

The results obtained are shown in Table 2 below and in the drawings. In the table the organic matter removed at each regeneration is expressed as a percentage of that taken up in the run immediately before the regeneration.

Table 2

| Regeneration | Organic matter removed during regeneration in percent of that taken up in the preceding run | |
|---|---|---|
|  | Microporous resin | Macroporous resin |
| 1 | 60 | 80 |
| 2 | 65 | 95 |
| 3 | 65 | 98 |
| 4 | 70 | 97 |

It is clear from Table 2 that the organic matter is taken up by and removed from the macroporous resin substantially reversibly, but at each run some organic matter is irreversibly held by the microporous resin.

FIGURE 1 is a graph in which the four curves show how the proportion of organic matter not trapped by the microporous resin changes as the total quantity of organic matter that has been fed to the column increases throughout each of four runs. FIGURE 2 is a similar graph showing the curves obtained with the macroporous resin. The graphs show that in successive runs the proportion of organic matter not trapped by the resin progressively increases with the microporous resin but varies very little with the macroporous resin.

EXAMPLE 5

The experiments of Example 4 were repeated with a water of the following composition:

|  | P.p.m. |
|---|---|
| Th. M.A. | 30 |
| Alk. A. | 20 |
| $SiO_2$ | 2 |
| Oxygen absorbed | 0.6–1.2 |

The results obtained were almost identical with those illustrated by FIGURES 1 and 2 so far as the change in the proportion of organic matter not trapped in successive runs was concerned. Table 3 shows the percentages of organic matter removed during each regeneration.

Table 3

| Regeneration | Organic matter removed during regeneration in percent of that taken up in the preceding run | |
|---|---|---|
|  | Microporous resin | Macroporous resin |
| 1 | 55 | 75 |
| 2 | 60 | 90 |
| 3 | 70 | 95 |
| 4 | 65 | 92 |

EXAMPLE 6

This illustrates the superiority of the macroporous resin in maintaining the capacity of an anion-exchange resin in a bed of mixed resins through which the water flowed after leaving the trap column. Two columns were arranged side by side, each consisting of 100 cc. of resin in a tube ¾″ in diameter, the resins being the same as in Example 4. Tap water was passed into each column and each effluent was passed through a mixed bed of 1 litre of a cation-exchange polystyrene resin having sulphonic acid groups with exchangeable sodium ions and 2 litres of the same anion-exchange resin as in Example 4. Each of these beds was contained in a 3 inch diameter tube which also contained means through which the mixed resins could be separated, separately regenerated and remixed. The cation-exchange resin was regenerated with 4.5 litres of 1.5% $H_2SO_4$ and the anion-exchange resin with 2 litres of 5% NaOH solution. The trap columns were each regenerated with 150 cc. 10% NaCl solution after the equivalent of about 0.5 lb. OA had entered, i.e. after the passage of about 30,000 gallons of water per cubic foot of resin.

Repeated cycles of flow of water and regeneration were carried out and the capacities of the anion-exchange resins in the mixed beds in kgr./cubic foot, the average conductivity of the effluent from each mixed bed in micromhos and the number of bed volumes of rinsing water required after regeneration to bring the conductivity of 2 micromhos were determined. The results obtained are given in Table 4.

Table 4

| Mixed Bed Run No. | Microporous + Mixed Bed | | | Macroporous + Mixed Bed | | |
|---|---|---|---|---|---|---|
|  | Cap. | Av. Cond. | Rinse | Cap. | Av. Cond. | Rinse |
| 1 | 7.3 | 0.2 | 3 | 7.3 | 0.2 | 3 |
| 100 | 6.8 | 0.3 | 3.5 | 7.3 | 0.2 | 3 |
| 200 | 6.5 | 0.5 | 4.5 | 7.2 | 0.2 | 3 |
| 400 | 5.6 | 0.8 | 5.5 | 7.3 | 0.2 | 3 |
| 700 | 4.5 | 1.0 | 6.5 | 7.2 | 0.2 | 3 |

The superiority of the macroporous trap column in maintaining the life of the mixed-bed resin is very marked.

EXAMPLE 7

The experiments of Example 6 were repeated with the same water as in Example 5. The results obtained are given in Table 5.

Table 5

| Mixed Bed Run No. | Microporous + Mixed Bed | | | Macroporous + Mixed Bed | | |
|---|---|---|---|---|---|---|
| | Cap. | Av. Cond. | Rinse | Cap. | Av. Cond. | Rinse |
| 1 | 7.4 | 0.15 | 3 | 7.3 | 0.15 | 3 |
| 100 | 6.5 | 0.6 | 4.5 | 7.2 | 0.2 | 3 |
| 200 | 5.6 | 0.9 | 6 | 7.0 | 0.2 | 3 |
| 400 | 4.3 | 1.2 | 7 | 7.3 | 0.2 | 3 |
| 500 | | | | 7.2 | 0.2 | 3 |

This second water contains a higher proportion of organic matter to total dissolved solids than the first water. Because of the lower T.D.S. a larger volume passed through each mixed bed at each run and contained a larger weight of organic matter than in Example 6. In consequence the mixed bed used after the microporous resin failed more rapidly than in Example 6. The macroporous resin, however, was as satisfactory as in Example 6.

We claim:

1. A process in which an aqueous liquid containing both organic impurities and inorganic anions is treated with a particulate anion-exchange resin containing strongly basic groups, said resin having pores therein of a mean pore diameter of at least about 100 Angstrom units, said anion-exchange resin having been produced by copolymerising a monomer having one polymerizable double bond, and at least 25% of a cross-linking agent having two polymerizable double bonds, in a solution in an organic liquid which is a solvent for the monomer mixture, but is not a solvent for the copolymer at room temperature, the solvent constituting from 30% to 80% of the total mixture.

2. A process as claimed in claim 1 in which said resin has at least 10% of its total pore volume in the form of pores greater than 350 Angstrom units in width.

3. A process as claimed in claim 1 in which the monomer is a mono-vinyl compound and the cross-linking agent is a divinyl compound.

4. A process as claimed in claim 1 in which the cross-linking agent is divinyl benzene.

5. A process as claimed in claim 4 in which the monomer is styrene.

6. A process as claimed in claim 1 in which the monomer is styrene.

7. A process in which organic impurities are removed from an aqueous liquid also contianing inorganic anions by passage of the liquid through a bed of particulate macroporous resin that contains strongly basic ion-exchange groups and is in ionic equlibrium with the liquid, said resin having at least 10% of its total pore volume in the form of pores greater than 350 Angstrom units in width, said anion-exchange resin having been produced by copolymerising a monomer having one polymerizable double bond, and at least 25% of a cross-linking agent having two polymerizable double bonds, in a solution in an organic liquid which is a solvent for the monomer mixture, but is not a solvent for the copolymer at room temperature, the solvent constituting from 30% to 80% of the total mixture.

8. A process according to claim 7, in which the inorganic anions are removed by ion exchange with a microporous anion-exchange resin.

9. A process according to claim 7, in which the inorganic anions are removed in an electrodialytic cell having membranes embodying a microporous anion-exchange resin.

10. A process according to claim 7, in which substantially all the anion-exchange groups are strongly basic.

11. A process for the demineralisation of water comprising passing the water through a bed of microporous cation-exchange resin and thereafter through a bed of a particulate anion-exchange resin containing strongly basic groups in the free-base form, said anion-exchange resin having a mean pore diameter of at least about 100 Angstrom units, said anion-exchange resin having been produced by copolymerising a monomer having one polymerizable double bond, and at least 25% of a cross-linking agent having two polymerizable double bonds, in a solution in an organic liquid which is a solvent for the monomer mixture, but is not a solvent for the copolymer at room temperature, the solvent constituting from 30% to 80% of the total mixture.

References Cited in the file of this patent

UNITED STATES PATENTS 2,591,573   McBurney _____ Apr. 1, 1952
2,591,574   McBurney _____ Apr. 1, 1952

OTHER REFERENCES

Skold et al.: "Ind. & Eng. Chem.," vol. 47, No. 1, January 1955, pages 90–96.

McGarvey et al.: Get Rid of Fouling in Ion Exchangers, Chemical Engineer, September 1954, volume 61, No. 9, pages 205–208.

Notice of Adverse Decision in Interference

In Interference No. 95,117 involving Patent No. 3,147,214, T. R. E. Kressman and J. R. Millar, REMOVAL OF ANIONS FROM AQUEOUS SOLUTIONS, final judgment adverse to the patentees was rendered June 12, 1969, as to claims 1, 2, 3, 4, 5 and 6.

[*Official Gazette November 25, 1969.*]